April 21, 1931. D. F. YOUNGBLOOD 1,802,301
INDICATING MECHANISM FOR CELL DOORS AND LOCKS
Filed Nov. 7, 1929 2 Sheets-Sheet 2
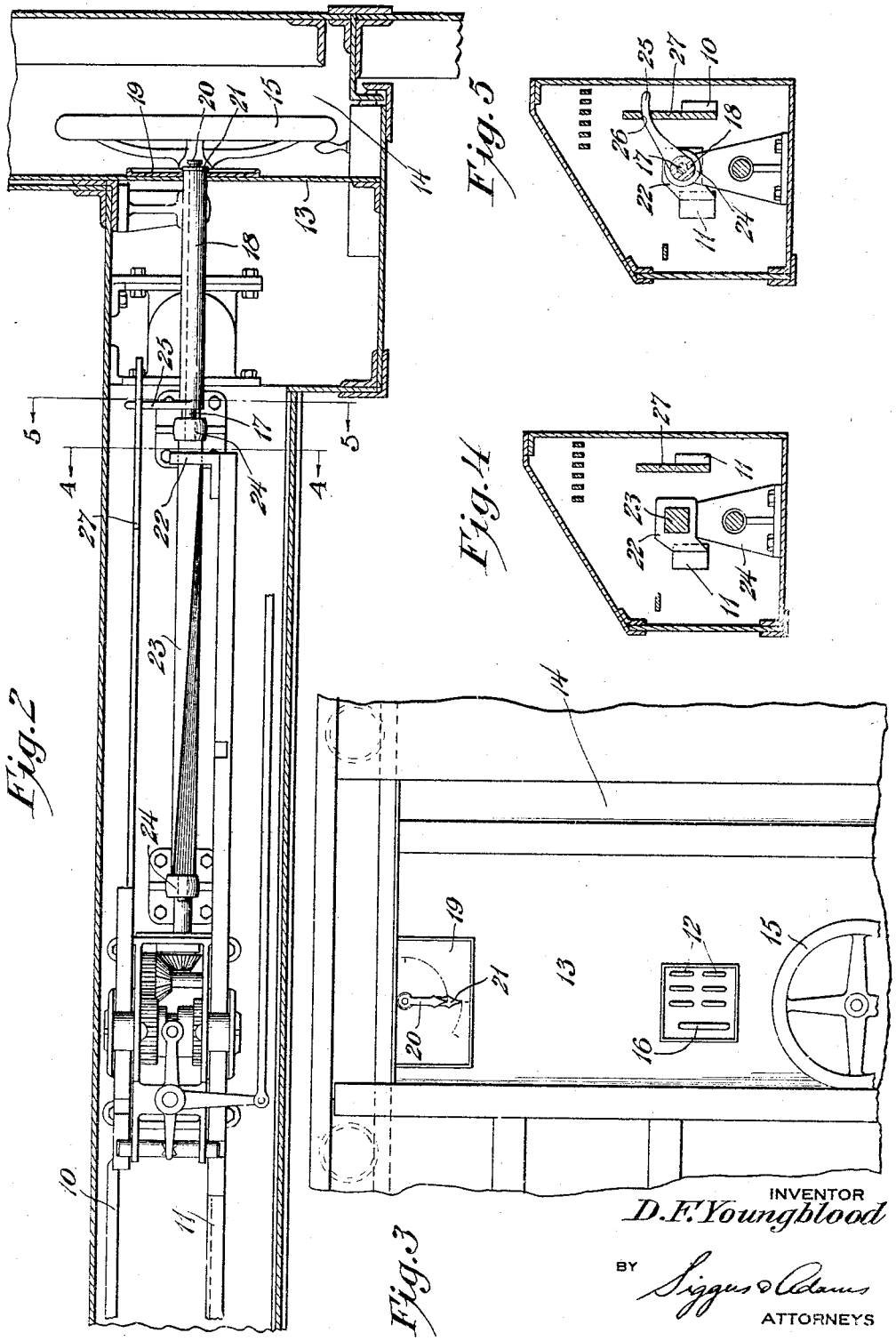

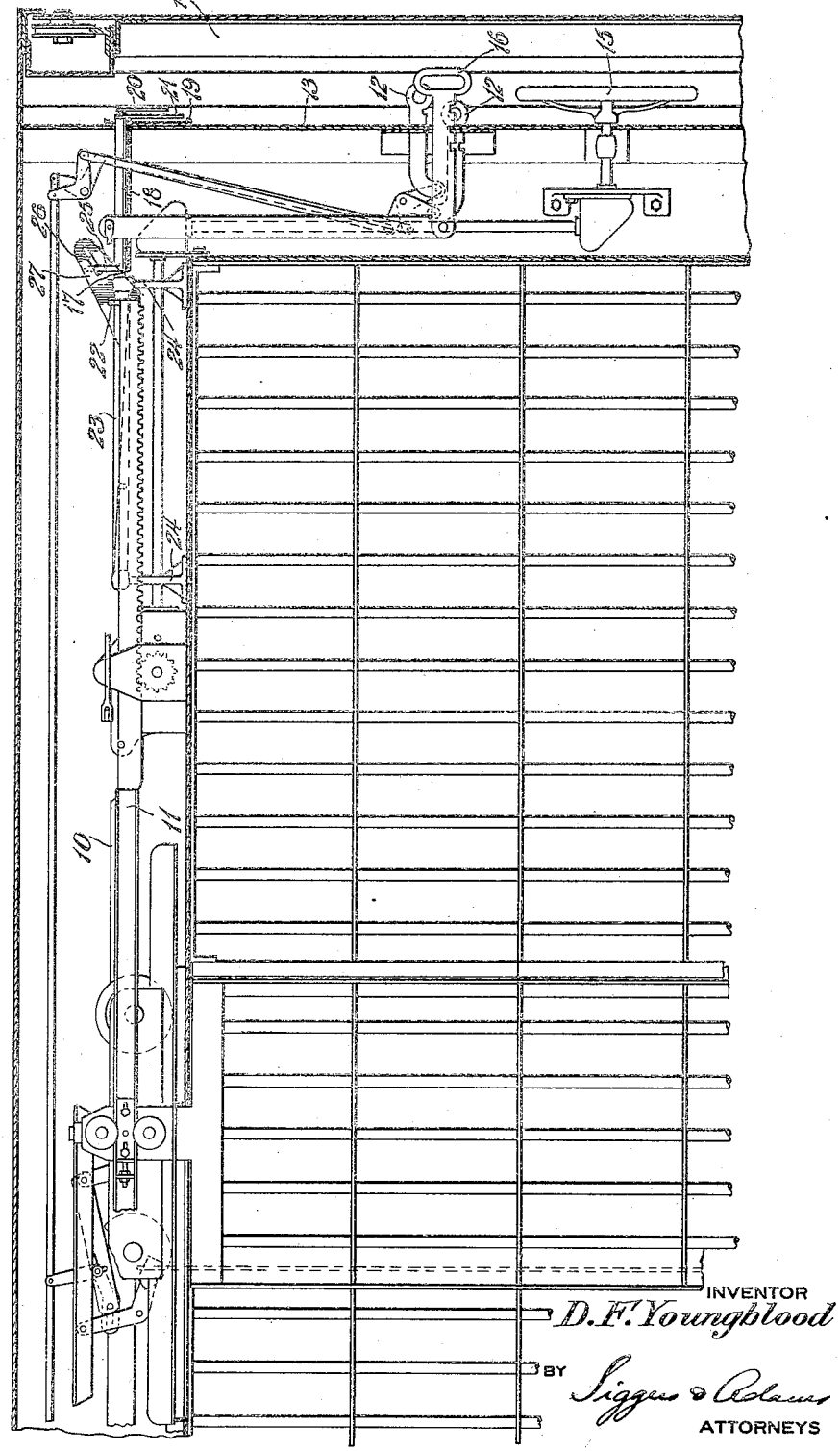

Patented Apr. 21, 1931

1,802,301

UNITED STATES PATENT OFFICE

DAVID FRANKLIN YOUNGBLOOD, OF SAN ANTONIO, TEXAS

INDICATING MECHANISM FOR CELL DOORS AND LOCKS

Application filed November 7, 1929. Serial No. 405,511.

This invention relates to master operated cell doors and locks and, among other objects, aims to provide improved indicating means whereby a jailer or attendant can tell at any time whether or not any of a series of doors and locks have been actuated, the idea being to enable him to stand at a master control box or station and tell instantly without looking down a long corridor whether the doors are closed and locked or open and unlocked.

This application involves certain improvements on the general type of master operated cell door systems shown in my Patents 1,269,244 and 1,611,260 as well as my copending application Ser. No. 386,035, filed August 15, 1929.

In the accompanying drawings:

Fig. 1 is a fragmentary side elevation, partly in section, showing one embodiment of the improved indicating mechanism in conjunction with master operating mechanism for a series of cell doors;

Fig. 2 is a top plan view of the mechanism certain parts being shown in section;

Fig. 3 is an end elevation of Fig. 2 looking into the inset control box with the door open;

Fig. 4 is a section taken on line 4—4 of Fig. 2; and

Fig. 5 is a section on the line 5—5 of Fig. 2.

Referring particularly to the illustrated embodiment of the invention, the indicating mechanism is there shown as being applied to master operating mechanism of the same design as that disclosed in my aforesaid application. The operating mechanism includes a master operating element or bar 10 for the locks and a master operating element or propelling bar 11 for the doors, one such door being shown in Fig. 1. These master elements are arranged to be selectively connected to the locks and doors by means of a plurality of selector levers 12 shown as projecting through a panel 13 within an inset control box 14. Selector mechanism for one door is shown in outline at the left end of Fig. 1. It is sufficient here to state that the selectors happen to be the same as those shown in my copending application, Ser. No. 386,036, filed August 15, 1929. A master operating hand wheel 15 is connected by gearing selectively and successively to actuate the master locking bar and the door propelling bar, a clutch actuating lever 16 being also arranged in the panel to control the geared connections to the hand wheel. However, it will be understood that separate levers like those shown in my aforesaid patents may be employed to operate the master bars.

As will be seen in Fig. 1, both of the master operating elements or bars are adapted to be reciprocated. They are usually pushed away from the control box, (assuming that it is arranged at the end of a long row of cells), to unlock and to open the doors. In accordance with the present invention, indicator mechanism is connected to these master bars or elements so that the operator can instantly tell whether any selected door or doors have been locked or unlocked and opened. Herein, the mechanism is shown as being purely mechanical but it is to be understood that electrical mechanism or a combination of electrical and mechanical mechanism may also be employed.

Referring to Figs. 2 to 5 inclusive, the two master bars are there shown as being connected to shafts 17 and 18 respectively which project through the inset control box panel 13 on which is arranged a suitable dial or plate 19 and a pair of hands 20 and 21 connected to the shafts are adapted to be turned therewith to indicate on the dial the positions of any or all of the doors and locks depending upon the number selected to be operated. In this example, the shaft 18 is tubular and the shaft 17 projects through it so that they are coaxial.

In Figs. 2 and 4, the master propelling bar 11 is shown as having an angle bracket 22 presenting a non-circular hole which is adapted to reciprocate on a twisted non-circular extension 23 of shaft 17, the arrangement being such that when the propelling bar is moved to door-opening position, the hand 20 will turn to the right, as viewed in Fig. 3. Herein, the shafts are journaled in suitable brackets 24 secured within the overhead casing for the operating mechanism.

The master locking bar 10 is shown as being connected to rotate or actuate the tubular shaft 18 by means of an arm 25 integral with the shaft and extending through a cam slot 26 in an extension member 27 of the lock bar. The arrangement is such that when the master bar 10 is moved to the left as viewed in Figs. 1 and 2, the hand or pointer 19 will swing to the left (Fig. 3) and indicate whether any locks which may have been selected are actuated.

The mechanism which has been described in my prior patents, and applications, is such that the selector levers or a series of push-buttons function to connect the selector mechanisms for the respective doors to the master lock operating lever and the selected doors are automatically connected to the propelling bar or element. When one or more of these selector levers are pushed in or out, as the case may be, to select one or more locks and doors to be operated, the jailer proceeds to manipulate the master operating hand wheel or levers. The positions of the levers or push-buttons show, at a glance, which doors, if any, have been selected. If he should happen to forget what operation or part of the operation he has performed, after manipulating the selector levers, he has but to glance at the selector levers and the points 18 and 19 to determine what he should do next. For example, if the hand 19 should indicate that the selected doors have been unlocked, he knows that the next operation in this instance is to manipulate the clutch lever 16 and turn the hand wheel 15 in the proper direction to open the unlocked doors.

From the foregoing description, it will be seen that the indicator mechanism functions to indicate the position of any or all of the doors and locks at all times and particularly any which may have been selected to be operated. In conjunction with the selector levers which are arranged in the operating panel within plain view, the jailer has an easy means of determining instantly and accurately what has been done or is to be done to the locks and doors in order to accomplish his purpose. Thus, he can work the locks and doors without leaving the control box to look down a long corridor and tell whether any door or doors have been unlocked and opened. Moreover, he does not need to expose himself to the view of any prisoners who may have been released from their cells into the main corridor. In fact, the master control box could be arranged at some remote point such as a jailer's room entirely out of reach of the incarcerated prisoners at all times. There are some other advantages which can only be appreciated by jail keepers of long experience, who know the habits of dangerous prisoners. It is unnecessary to attempt to outline them within the compass of this specification.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In combination with master operating mechanism for a series of cell doors including a pair of longitudinally movable master operating elements arranged selectively to actuate the locks and doors, mechanical indicator means associated with and operable directly by said master elements positively to indicate to the operator whether any or all of the doors have been unlocked and/or opened and the extent to which the doors are opened.

2. In combination with master operating mechanism for a series of cell doors having master lock operating and door propelling elements and selective master operating means at a control station, indicating means at the station connected to be actuated by said elements to signify the positions of said locks and doors.

3. In combination with master operating mechanism for a series of cell doors having master lock operating and door propelling elements and selective master operating means at a control station, visible indicating means at the station mechanically connected to said elements and arranged to be actuated incident to the movements of said elements whereby to indicate to the operator the extent to which any or all selected locks and doors have been moved.

4. In combination with master operating mechanism for a series of cell doors having master lock operating and door propelling elements and selective master operating means at a control station, a dial indicator at the control station having pointers operatively connected to said master elements.

5. In combination with master operating mechanism for a series of cell doors having master lock operating and door propelling elements and selective master operating means housed within a control box, a dial indicator visible to an operator and having pointers mechanically connected to the respective master operating elements whereby the operator can tell at all times whether any door is unlocked and/or open.

6. In combination with master operating mechanism for a series of cell doors including master operating elements arranged selectively to actuate the locks and doors, an indicator connected to be operated by the master lock operating element and arranged so that the operator can tell whether the element has been actuated to unlock any of the doors.

7. In combination with master operating mechanism for a series of cell doors including master operating elements arranged selectively to actuate the locks and doors, an indicator connected to the door operating element and having means whereby the operator can tell whether the element has been actuated to open any of the doors.

8. In combination with a master operating system for a series of cell doors including master lock and door propelling bars and selector levers to effect selective engagement of the bars to the locks and doors, an indicator comprising a pair of pointers connected to be turned by the bars when they are moved and arranged at the operating station so that an operator can tell at a glance whether any selective connections have been effected and, if so, whether the selected locks and/or doors have been operated.

9. In combination with a master operating system for a series of cell doors including master lock and door propelling bars and selector levers to effect selective engagement of the bars to the locks and doors, an indicator comprising a pair of pointers positioned on a panel at the operating station; shafts connected to said pointers; and connections between the shafts and the respective bars to move the pointers incident to movement of the bars so that an operator can determine the condition of the locks and doors which have been connected to be actuated.

10. In combination with a master operating system for a series of cell doors including master lock and door propelling bars and selector levers to effect selective engagement of the bars to the locks and doors, an indicator comprising a pair of pointers; a dial adjacent to the pointers; a pair of concentric shafts carrying the pointers; a twisted non-circular extension on the inner shaft; a bracket on one of the bars having a similar non-circular opening slidably receiving said twisted extension to turn said shaft; a crank arm on the outer shaft; and a slotted cam member carried by the other bar to actuate said arm.

11. In a master operating system for a series of cell doors including master operating elements arranged to be selectively connected to any of the doors and their locks, selector devices operable to effect such selective connections and visible to the operator of the system so that he can tell which doors have been selected; and an indicator associated with the operating mechanism and so arranged that the operator can tell the condition of all of the selected doors and locks.

12. In a master operating system for a series of cell doors including master operating elements arranged to be selectively connected to any of the doors and their locks, selector devices operable to effect such selective connections and visible to the operator of the system so that he can tell which doors have been selected; and a visible indicator connected to the master operating mechanism and arranged near the selector devices so that the operator can tell at a glance whether the selected doors and locks have been actuated and the extent to which they have been moved.

In testimony, that I claim the foregoing as my own, I have hereto affixed my signature.

DAVID FRANKLIN YOUNGBLOOD.